J. L. REBER.

PAPER-BOX.

No. 6,806. Reissued Dec. 14, 1875.

Witnesses:
William A. Lorenz,
George Roberts

Inventor:
James L. Reber,
by Munn & Philipp,
Attorneys.

UNITED STATES PATENT OFFICE.

JAMES L. REBER, OF CHICAGO, ILL., ASSIGNOR, BY MESNE ASSIGNMENTS, TO EDWIN B. MUNSON.

IMPROVEMENT IN PAPER BOXES.

Specification forming part of Letters Patent No. 91,666, dated June 22, 1869; reissue No. 6,806, dated December 14, 1875; application filed November 23, 1875.

*To all whom it may concern:*

Be it known that I, JAMES L. REBER, of the city of Chicago, county of Cook and State of Illinois, (formerly of Philadelphia, Pennsylvania,) have invented a new and useful Improvement in Paper Boxes; and I do hereby declare the following to be a full, clear, and exact description of the same, reference being had to the accompanying drawing, forming a part of this specification.

The object of my invention is to produce from a blank formed of one piece of paper a box, without any fastening material for closing its ends other than the parts of said blank of paper, which, when partially or entirely unfolded, will be capable of being packed flat and in a very compact form for storage or shipment; and it consists of a blank formed from one piece of paper, and the box produced therefrom, as will be hereinafter more fully described and claimed.

Figure 4:
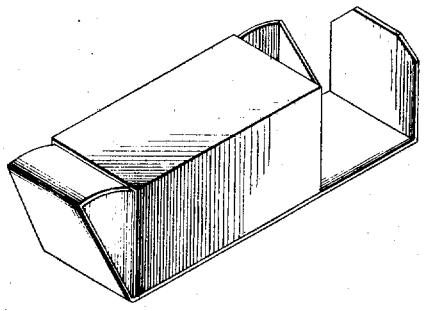
Figure 1:
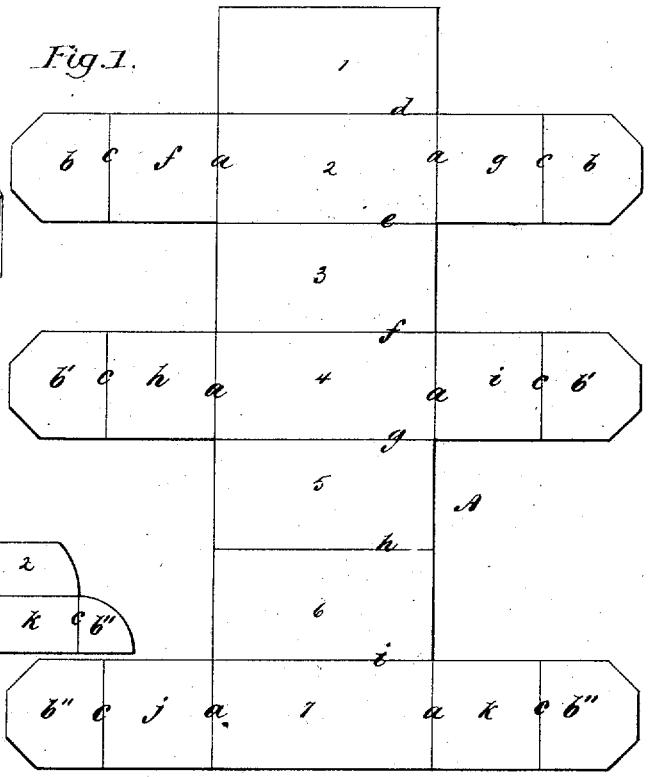
Figure 3:
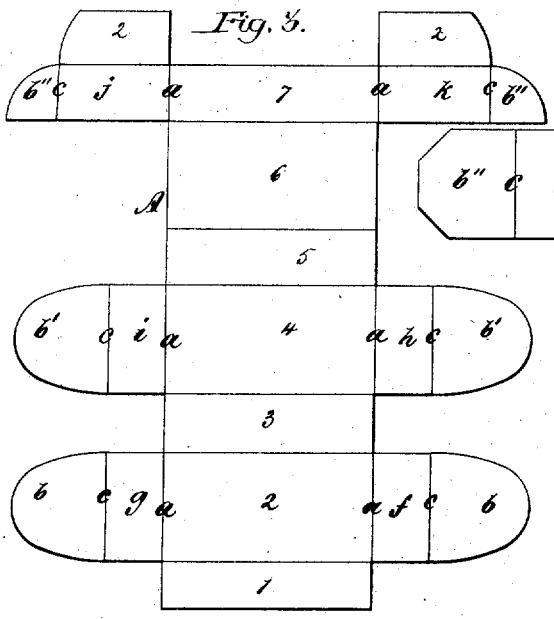
Figure 2:
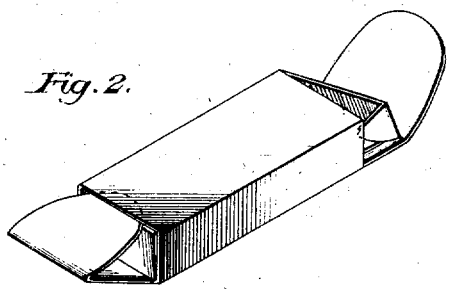

Figure 1 represents a plan view of a blank from one piece of paper, which may be folded into a box whose ends may be closed and fastened by the tongues *b b′ b″*. Fig. 2 represents a perspective of this blank folded into a box, which is shown partially closed. Fig. 3 represents a plan view of a blank slightly modified in form. Fig. 4 represents a perspective view of the blank shown in Fig. 3, folded into a box partially closed.

The blank A consists of a series of flaps, *f g h i j k*, each provided with a tongue and intermediate body parts numbered from 1 to 7, inclusive. Of these parts, those numbered from 1 to 4, inclusive, are made the width and length of the interior of the box, and form the box body proper, while those numbered from 5 to 7, inclusive, are of the length and width of the exterior of the box, and form double walls thereof when lapped over the parts 1 2 3. The blank A of this form is produced in one piece of paper by cutting or otherwise forming the same. To produce a box therefrom, the part 1 is folded upon the line *d*, the flaps *f g* are folded upon the lines *a*, and the part 3 folded upon the line *e*. In this position the partly-formed box consists of the part 2, forming the bottom, the parts 1 and 3, the sides, and the flaps *f g*, forming the ends of the box. The tongues *b* of the flaps *f g* are then folded on the lines *c* over the top of the box. The part 4 is then folded upon the line *b* down on the top, and the flaps *h i* thereof folded down on the lines *a* over the ends *f g*, and the tongues *b′* under the bottom 2 of the box. The part 5 is then folded upon the line *g* over the side 1, the part 6 on the line *h* under the bottom 2, and the tongues *b′* of the top 4, and the part 7 on the line *i* over the side 3. The flaps *j k* are then folded on the lines *a* over the ends *f g h i*, and the tongues *b″* thereof inserted between the parts 1 and 5 forming one side, this completing the folding.

The body may be folded up first and the ends closed afterward, the result being the same whatever order of folding is adopted.

The box is thus formed into a rectangular form, with double bottom, sides, and ends, the parts being securely locked into position and prevented from being forced apart by the weight of the material with which it may be filled, by reason of the holding tongues, as described.

In the modification as shown in Fig. 3, the flaps *j k* are provided with tongues *l*, which are inserted between the parts 4 and the tongues *b* of the flaps *g*, to more securely hold the box in a rectangular position.

The blank A may be packed flat, as shown in Figs. 1 and 3, or it may be partially folded upon the lines *g a*, or simply upon the line *g*, or upon the lines *d f h*, or any of the lines *f g h i a c*, for storage or shipment. Its end-closing flaps may be opened by withdrawing their holding-tongues to admit access to the interior, as is apparent from Figs. 2 and 4, which show it in a partially-closed condition.

It is obvious that the blank may be folded into box-form in the manner described, and filled by opening its ends to gain access to its interior, and that its end flaps may be closed in any order that may be deemed expedient, and which provides a space for the introduction of the holding-tongues. By unfolding its ends its body may be pressed down flat.

While I propose to use paper, which I consider the best material, I may, if desired, make use of other suitable substance.

A box thus made requires no other fastening to hold it together than the parts, lips, and tongues described, though the overlapping parts forming its body may, if desired, be pasted together, as is the common practice. It can be cheaply manufactured, and can be compactly packed, either wholly or partially unfolded for storage or shipment.

Having thus fully described my invention, and the merits it possesses, what I claim as new, and desire to secure by Letters Patent, is—

1. A paper box formed from a blank consisting of one piece, which is held together without the use of any fastening means other than tongues *b*, when it is folded into tubular box form, substantially as shown and described.

2. A paper box formed in one piece, which, when partially or wholly unfolded, is capable of being packed flat for storage or shipment, and provided with means for securing it in tubular form, substantially as shown and described.

3. Paper boxes formed from a blank consisting of one piece, and having the body, end pieces, and tucking-flaps shaped and folded substantially as shown and described.

4. A paper box the body and closing flaps whereof are formed in one piece, the said box being adapted to fold flat for storage or shipment, to be formed into tubular shape and to have its ends closed and fastened by the said flaps, substantially as shown and described.

5. A paper box provided with end flaps adapted to fold over and tuck into the box end to close the same, substantially as shown and described.

In testimony whereof I have hereunto set my name in the presence of two subscribing witnesses.

J. L. REBER.

Witnesses:
B. S. BRYAN,
J. VANDAGRIFT.